United States Patent
Sperandei et al.

(10) Patent No.: US 10,659,159 B2
(45) Date of Patent: May 19, 2020

(54) COMBINED IMAGING AND LASER COMMUNICATION SYSTEM

(71) Applicant: AIRBUS DEFENCE AND SPACE SAS, Toulouse (FR)

(72) Inventors: Jean Sperandei, Toulouse (FR); Gilles Planche, Toulouse (FR)

(73) Assignee: Airbus Defence and Space SAS, Toulouse (FR)

( * ) Notice: Subject to any disclaimer, the term of this patent is extended or adjusted under 35 U.S.C. 154(b) by 0 days.

(21) Appl. No.: 16/341,274

(22) PCT Filed: Sep. 28, 2017

(86) PCT No.: PCT/FR2017/052654
§ 371 (c)(1),
(2) Date: Apr. 11, 2019

(87) PCT Pub. No.: WO2018/073507
PCT Pub. Date: Apr. 26, 2018

(65) Prior Publication Data
US 2019/0238226 A1 Aug. 1, 2019

(30) Foreign Application Priority Data

Oct. 21, 2016 (FR) ..................... 16 60213

(51) Int. Cl.
*H04B 10/118* (2013.01)
*H04B 10/50* (2013.01)

(52) U.S. Cl.
CPC ......... *H04B 10/118* (2013.01); *H04B 10/503* (2013.01)

(58) Field of Classification Search
None
See application file for complete search history.

(56) References Cited

U.S. PATENT DOCUMENTS 3,838,834 A * 10/1974 Michaelis ................ B64G 1/32
244/166
5,777,768 A * 7/1998 Korevaar ........... H04B 10/1127
398/129

(Continued)

FOREIGN PATENT DOCUMENTS

CA    2 908 237       11/2014
EP    1 635 485        3/2006

(Continued)

OTHER PUBLICATIONS

International Search Report for PCT/FR2017/052654, dated Mar. 22, 2018, 8 pages.

(Continued)

*Primary Examiner* — David W Lambert
(74) *Attorney, Agent, or Firm* — Nixon & Vanderhye P.C.

(57) ABSTRACT

A combined system for imaging and communication by laser signals including a telescope (10) in which the primary (1) and secondary (2) mirrors are shared between an imaging function and a function involving the emission of laser transmission signals. The accuracy required for the direction of emission (DE) of the laser transmission signals is obtained by additionally placing a geolocation device on board a satellite carrying the combined system. No coarse pointing assembly is used and it is also possible for the system to be devoid of any fine pointing assembly and target acquisition and tracking detector.

10 Claims, 7 Drawing Sheets

(56) References Cited

U.S. PATENT DOCUMENTS 6,142,423 A * 11/2000 Wehner .................. B64G 1/242
244/164
2004/0021852 A1    2/2004 DeFlumere

FOREIGN PATENT DOCUMENTS

EP          2 388 646        11/2011
EP            2388646 A1 * 11/2011  ........... G03B 15/006

OTHER PUBLICATIONS

Written Opinion of the ISA, for PCT/FR2017/052654, with English Translation dated Mar. 22, 2018, 23 pages.
International Preliminary Report on Patentability, with English translation, dated Oct. 2, 2018, 13 pages.

* cited by examiner

COMBINED IMAGING AND LASER COMMUNICATION SYSTEM

This application is the U.S. national phase of International Application No. PCT/FR2017/052654 filed Sep. 28, 2017, which claims priority to French Patent Application 16 60213 filed Oct. 21, 2016, the entire contents of each of these applications is incorporated by reference.

The present invention relates to a combined imaging and laser communication system, a satellite carrying such a system, and a method for communication by laser signals.

Communication by laser signals between a satellite which is in orbit around the Earth and a laser communication receiver which may be located on Earth or on another satellite is well known. Commonly, a terminal dedicated to communication by laser signals is on board the satellite. Such a laser communication terminal usually comprises a source of laser radiation, a laser communication controller, optics for outwardly emitting laser radiation, a coarse pointing assembly designated by CPA, and a fine pointing assembly designated by FPA. The emission optics is generally a telescope with at least two mirrors, comprising a primary mirror and a secondary mirror. The coarse and fine pointing assemblies are used to direct and maintain in real time the direction of emission of the terminal according to a target direction which is determined as pointing towards the laser communication receiver. To do so, the direction of emission is estimated in real time based on the propagation of orbitography data, this data being periodically loaded from ground to satellite, for example once with every revolution of the satellite in its orbit or once a day. In other words, the satellite coordinates are updated at separate times, and the target direction is then calculated based on coordinates of the laser communication receiver, and based on the later position of the satellite where the laser transmission signals will be emitted. This position of the satellite during the emission of laser transmission signals, and then the target direction for the emission of these signals, are calculated from the last update for the satellite coordinates. These calculations are usually done in an inertial reference frame, meaning a reference frame that is fixed relative to the distant stars.

In a known manner, the coarse pointing assembly comprises a two-axis gimbal on which is mounted the optical part of the laser communication terminal, or on which is mounted an output mirror of the terminal. Such a coarse pointing assembly is comprised of a support having two axes of rotation, two motors, and the necessary controllers.

Also in a known manner, the fine pointing assembly comprises a small movable mirror, which is arranged in the path of the laser radiation of the laser transmission signals between a source of this laser radiation and the optics for outwardly emitting laser radiation. This movable mirror is arranged on a portion of the path of the laser transmission signals, within the terminal, which is common to the emission and reception paths in order to stabilize the terminal's line of sight. In this manner it is possible to eliminate interference present in the same line of sight. To do this, the fine pointing assembly also comprises actuators and an additional controller for directing the movable mirror.

In addition, and again in a known manner, a laser communication terminal which is on board a satellite further comprises a target acquisition and tracking system, or ATS. The functions of such a target acquisition and tracking system are initially to detect and then to track the remote laser communication receiver to which are transmitted the signals emitted from the satellite. Such a system comprises an array-based image detector, and allows controlling at least the adjustment of the fine pointing assembly to a deviation occurring between the direction of emission of the laser transmission signals and the direction of reception of laser signals emitted by the remote receiver.

Document EP 1635485 indicates that improvements have been made to attitude and orbit control systems for satellites, which allow eliminating the coarse pointing assembly for laser communication terminals on board the satellites. The optics for the emission of laser radiation by the device is then rigidly fixed to a frame of the satellite, such that the optical axis of this optics is fixed relative to the frame. The direction of emission of laser transmission signals by the terminal is then adjusted to the target direction by both orienting the entire satellite and using the fine pointing assembly.

Satellites are commonly used for imaging missions, where images of the Earth's surface are captured by imaging instruments on board the satellites, and where the optics portion is generally composed of a telescope. Communication by the transmission of laser signals is well-suited for the transmission of image data to a remote receiver which may be located on Earth or on another satellite. It allows very high speed data transfers with low power consumption. However, the complexity and cost of optical communication systems, particularly because of the pointing assemblies and associated control systems, limits the use of this technology.

Considering this situation, the object of the invention is to reduce the number of components of such a satellite that contribute to its weight, its cost, and the cost of its launch.

To achieve at least one of these or other objects, a first aspect of the invention provides a combined system for imaging and communication by laser signals, which comprises:

a telescope, comprising at least a primary mirror and a secondary mirror, and adapted for forming, in a focal plane of the telescope, an image of a scene located in a pointing direction of the telescope, by reflection of radiation received from the scene at least on the primary mirror then on the secondary mirror; and an image sensor, which is arranged in the focal plane of the telescope and is able to capture the image of the scene; and a source of laser radiation, which is adapted for producing laser transmission signals.

According to the invention, the source of laser radiation is arranged so that the laser radiation which constitutes the laser transmission signals is reflected by at least the secondary mirror then by the primary mirror, to be emitted towards a laser communication receiver external to the system. In other words, the primary and secondary mirrors of the same telescope are used for the two functions of imaging and emitting laser transmission signals. This combination of functions eliminates the addition of another telescope specifically dedicated to the function of emitting laser transmission signals, independently of a first telescope dedicated to the imaging function.

In general for the invention, the telescope may further comprise a tertiary mirror and be adapted for forming the image of the scene in the focal plane of the telescope by reflection of the radiation received from the scene, successively on the primary mirror, then the secondary mirror, then the tertiary mirror. In particular, the telescope may be of the Korsch type, as is commonly used for the imaging function of Earth observation satellites.

In such embodiments of the invention with primary, secondary, and tertiary mirrors, the system may be arranged so that the laser radiation which constitutes the laser transmission signals is reflected by the secondary mirror then by the primary mirror without being reflected by the tertiary mirror, for emission towards the laser communication receiver external to the system. To do this, the laser radiation which constitutes the laser transmission signals may be introduced into an intermediate focal plane of the telescope which is effective for radiation reflected by the primary and secondary mirrors but not the tertiary mirror.

In other embodiments of the invention which are again with primary, secondary, and tertiary mirrors, the system may alternatively be arranged so that the laser radiation which constitutes the laser transmission signals is successively reflected by the tertiary mirror, then by the secondary mirror, then by the primary mirror, for emission towards the laser communication receiver external to the system. In this case, the system may be further arranged to bring the laser radiation which constitutes the laser transmission signals to a location of the focal plane that is distanced from the image sensor. Bringing the laser radiation to a specific location is understood to mean any means for introducing and/or guiding the laser radiation from the source of this radiation to the determined location. This includes in particular the placement of the source at this location, particularly when the source is a laser diode, or a guiding of the laser radiation by optical fiber for at least a portion of an optical path from the source of the laser radiation to the determined location, or any optical system possibly based on at least a mirror, semi-reflecting plate, or refracting surface which transfers the laser radiation from the source to the determined location.

Alternatively, the system may further comprise a focal plane duplication element which is arranged to create an image of the focal plane of the telescope, called the secondary focal plane. The system can then be arranged so that the laser radiation which constitutes the laser transmission signals is brought to a location of the secondary focal plane which is optically superimposed on the image sensor by the focal plane duplication element. The laser radiation of the laser transmission signals, produced by the source of laser radiation, is then directed by the focal plane duplication element toward the tertiary mirror, and then successively reflected by this tertiary mirror, then by the secondary mirror, then by the primary mirror, in order to be emitted towards the laser communication receiver external to the system. In such embodiments of the invention, the focal plane duplication element may comprise a mirror or a dichroic plate which is arranged to reflect one among the laser radiation of the laser transmission signals and the radiation received from the scene, and to transmit the other one of these two radiations without reflection by this mirror or dichroic plate.

If necessary, the system may further comprise a path for receiving external laser communication signals. Such a reception path may comprise a reception detector and be arranged so that the radiation of the external laser communication signals emitted by the laser communication receiver external to the system, is reflected by at least the primary mirror and then by the secondary mirror before reaching the reception detector. Thus, at least the primary and secondary mirrors of the telescope are also shared with the reception path. Advantageously, the system may be further arranged so that the laser radiation of the laser transmission signals emitted by this system, and the radiation of the external signals emitted by the laser communication receiver external to the system, and which reaches the reception detector, follow identical optical paths within the telescope while traveling in opposite directions of propagation.

A second aspect of the invention provides a satellite intended for placement in orbit around the Earth, and comprises:
 a combined system for imaging and communication by laser signals which is according to the first aspect of the invention, and which is fixed on a frame of the satellite so that the pointing direction of the telescope is fixed relative to the frame;
 satellite orientation means; and
 an attitude and orbit control system which is adapted for controlling the satellite orientation means in order to bring the direction of emission of the laser transmission signals to a target direction, so that the combined system for imaging and communication by laser signals then emits the laser transmission signals in the target direction.

Because the pointing direction of the telescope is fixed relative to the frame in such a satellite, it has no coarse pointing assembly. The telescope's pointing direction for the imaging function is adjusted using only the satellite orientation means. The direction of emission of the laser transmission signals can also be adjusted using the same satellite orientation means, but possibly additionally using, where applicable, a fine pointing assembly which may be present in the combined system for imaging and communication by laser signals, in the optical path of the laser radiation of the laser transmission signals that are emitted.

According to an additional feature of the invention, the satellite further comprises:
 a geolocation device, which is adapted for receiving geolocation signals and to calculate a position of the satellite based on the geolocation signals received; and
 a module, which is adapted for calculating the target direction based on the position of the satellite as calculated by the geolocation device and based on coordinates of the laser communication receiver external to the satellite, so that the target direction points from the satellite towards this laser communication receiver.

Possibly, the geolocation device of the satellite may be a GPS device or any other geolocation device deployed independently of the satellite of the invention.

According to an improvement of a satellite according to the second aspect of the invention, an accuracy of the geolocation device for calculating the satellite position, and an accuracy of the satellite orientation means may be adapted so that the laser transmission signals emitted from the satellite are received by the laser communication receiver external to the satellite while the direction of emission of the laser transmission signals is kept fixed with respect to the telescope. In other words, the system of the invention installed on board the satellite may be without any fine pointing assembly. The direction of emission of the laser transmission signals is then adjusted solely by using the satellite orientation means.

Advantageously, when no fine pointing assembly is used, the satellite may also be devoid of any target acquisition and tracking system operating based on external laser signals emitted by the laser communication receiver external to the satellite. In this case, the accuracy of the geolocation device for calculating the satellite position and the accuracy of the satellite orientation means are adapted so that the laser transmission signals emitted from the satellite are received by the laser communication receiver external to the satellite, when the satellite orientation means are controlled to orient the direction of emission of the laser transmission signals to the target direction. The system for communication by laser signals which is installed on board the satellite is then particularly simple.

Finally, a third aspect of the invention provides a method for communication by laser signals, which is implemented on board a satellite in orbit around the Earth and in accordance with the second aspect of the invention, this method comprising the following steps:

/1/ receiving geolocation signals, then calculating a position of the satellite from the geolocation signals received;

/2/ from the position of the satellite calculated in step /1/, and from the coordinates of the laser communication receiver external to the satellite, calculating the target direction for laser transmission signals to be emitted from the satellite toward the laser communication receiver; then /3/ orienting the satellite into the calculated target direction, then activating the source of laser radiation in order to emit the laser transmission signals towards the laser communication receiver.

According to the invention, step /1/ is executed several times during one revolution of the satellite in its orbit, and steps /2/ and /3/ are executed using the satellite position as calculated in the latest execution of step /1/. The use of geolocation to obtain the satellite coordinates, and repeating the geolocation operation several times during each revolution of the satellite in its orbit, provides the satellite's position with an accuracy that is sufficient to eliminate the coarse pointing mechanism and possibly also the fine pointing assembly, and possibly also eliminate the target acquisition and tracking system as well.

In possible uses of a method according to the invention, an orbit altitude of the satellite may be less than 2000 km (kilometers), and the laser communication receiver may be located on the Earth's surface or on another Earth satellite which also has an orbit altitude of less than 2000 km, or on another satellite which is in geostationary orbit.

Other features and advantages of the invention will become apparent from the following description of some non-limiting example embodiments, with reference to the accompanying drawings in which.

Figure 5:
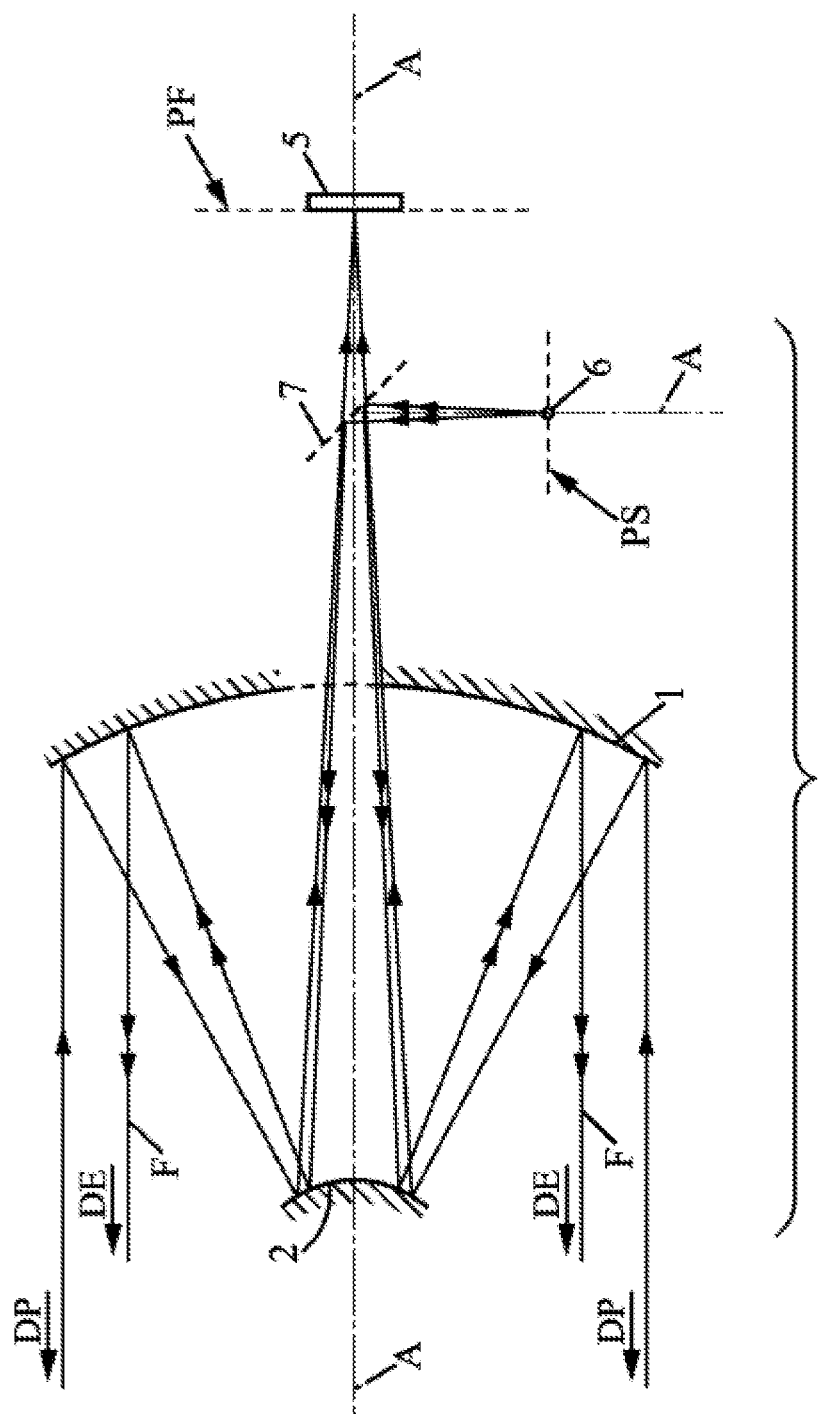
Figure 6:
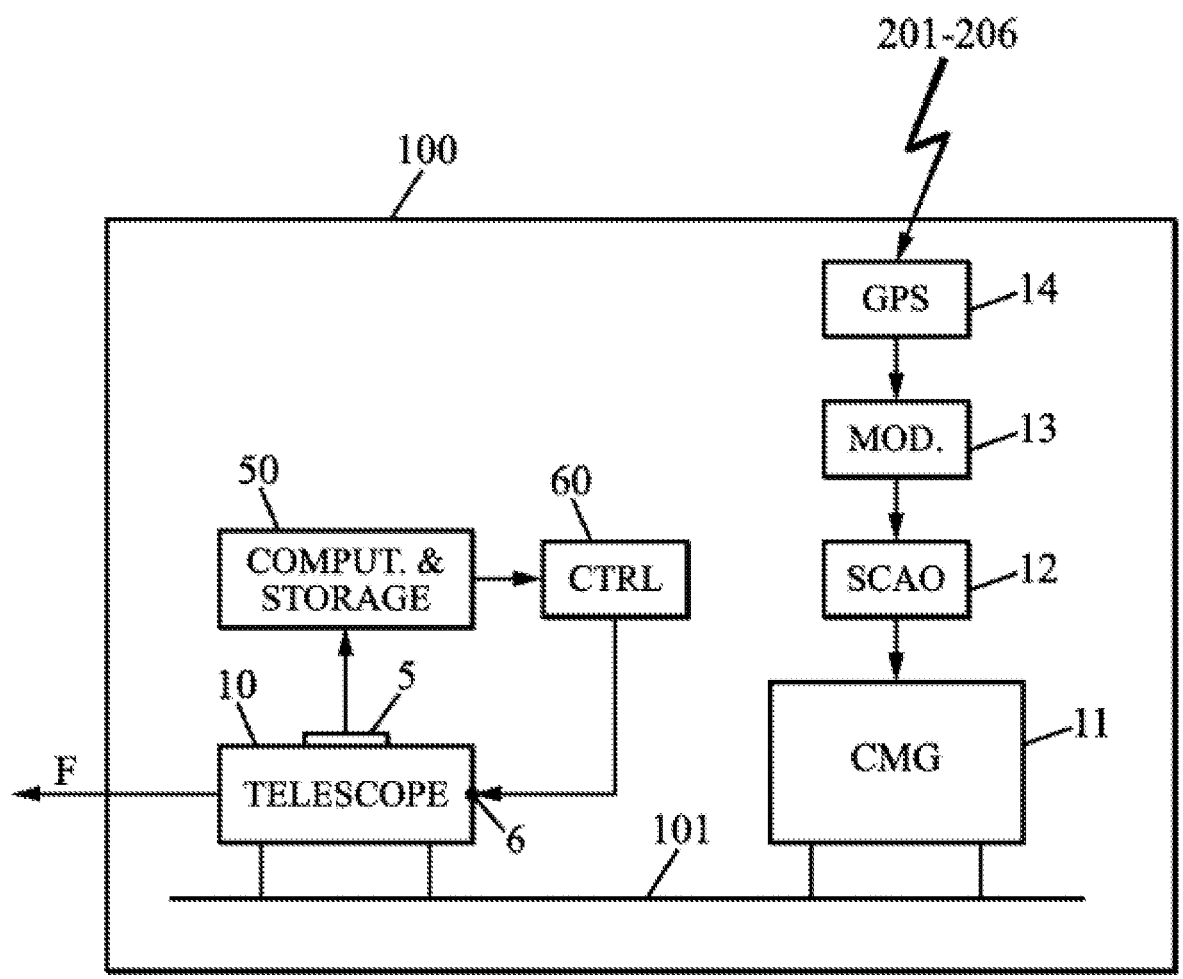
Figure 7:
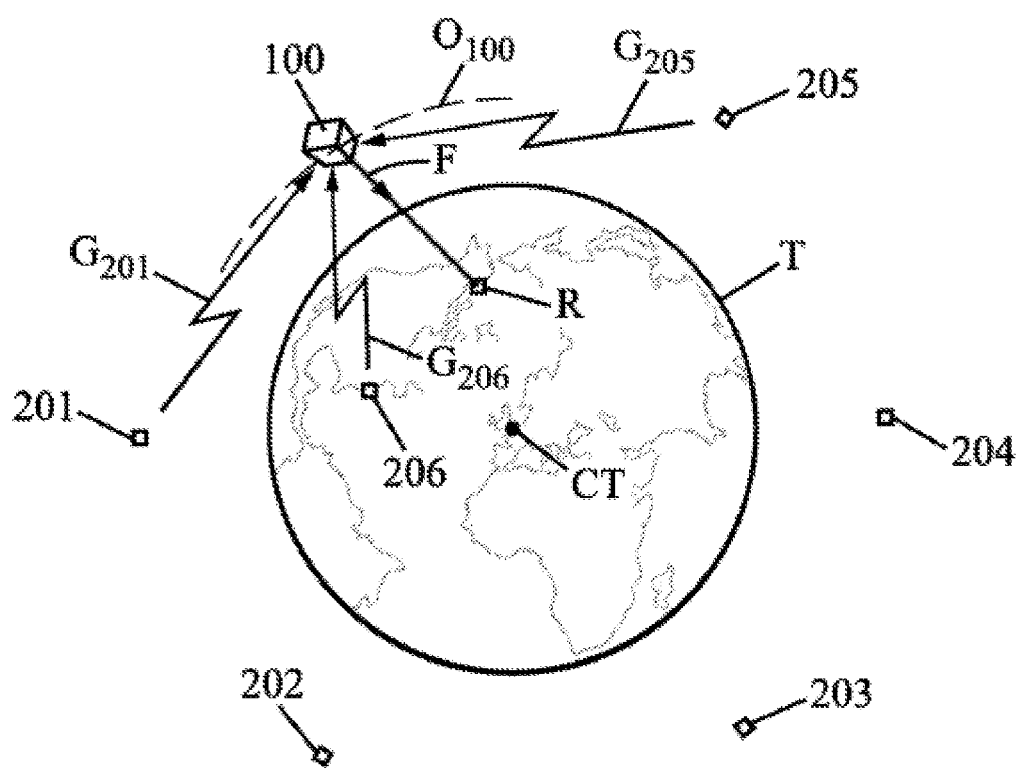

FIG. 6 schematically shows some equipment of a satellite according to the invention; and FIG. 7 illustrates a use of a satellite according to FIG. 5.

For clarity, the dimensions of the elements shown in these figures do not correspond to their actual dimensions or actual dimension ratios. Furthermore, identical references indicated in different figures denote identical elements or elements that have identical functions.

Figure 2:
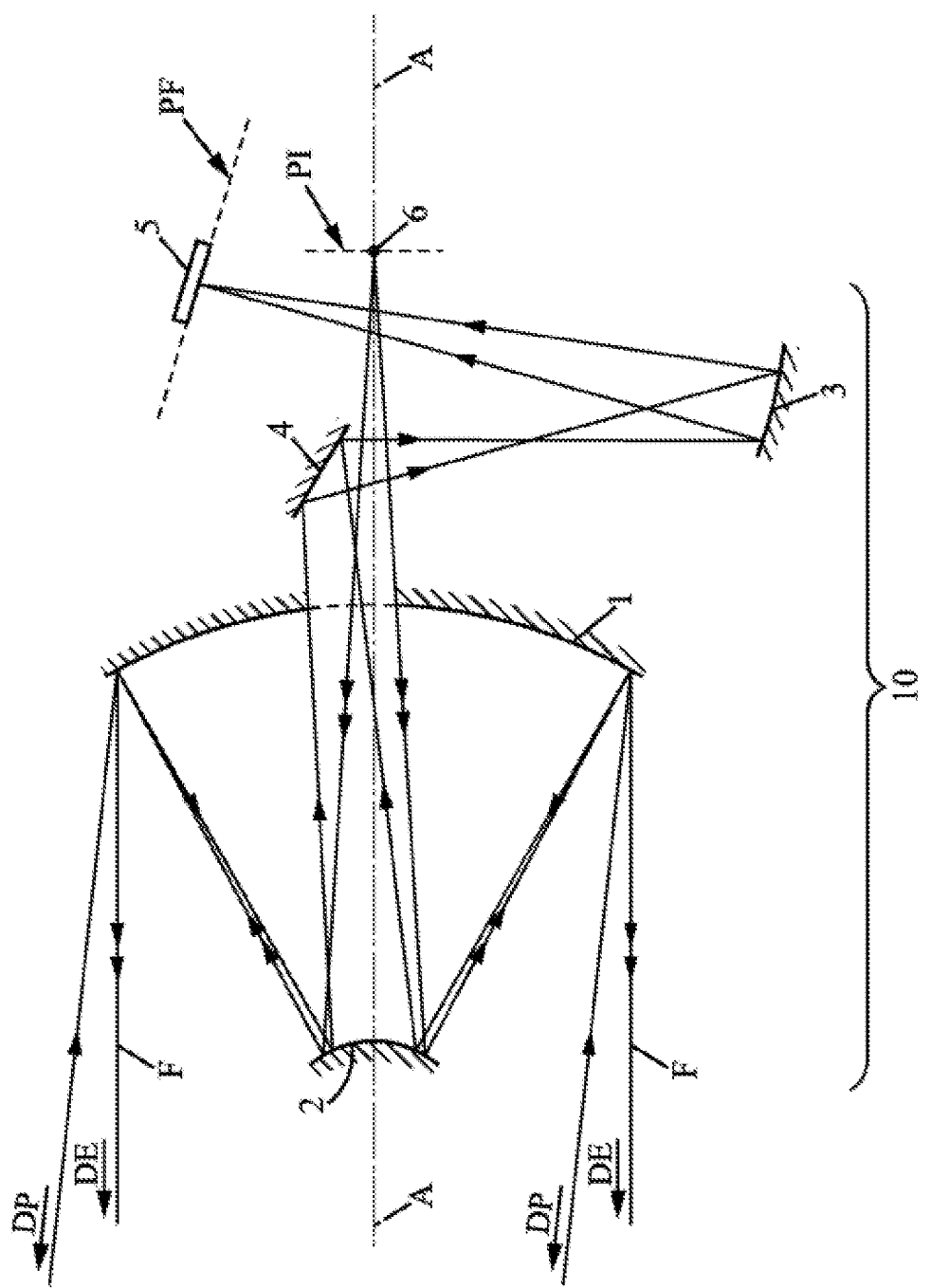
FIGS. 2 to 5 are optical diagrams of combined systems for imaging and communication by laser signals, for four different embodiments of the invention.
Figure 3:
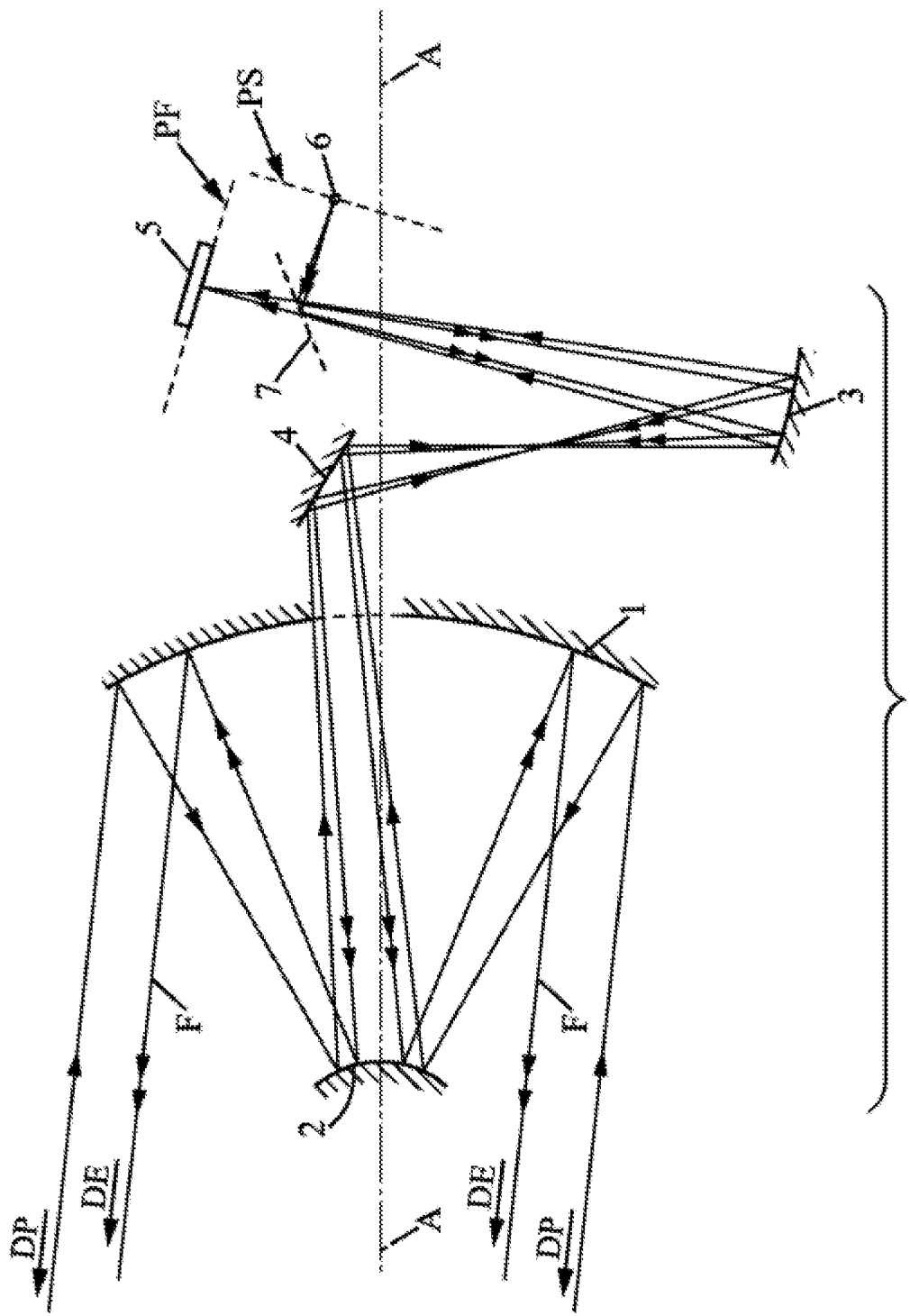
Figure 4:
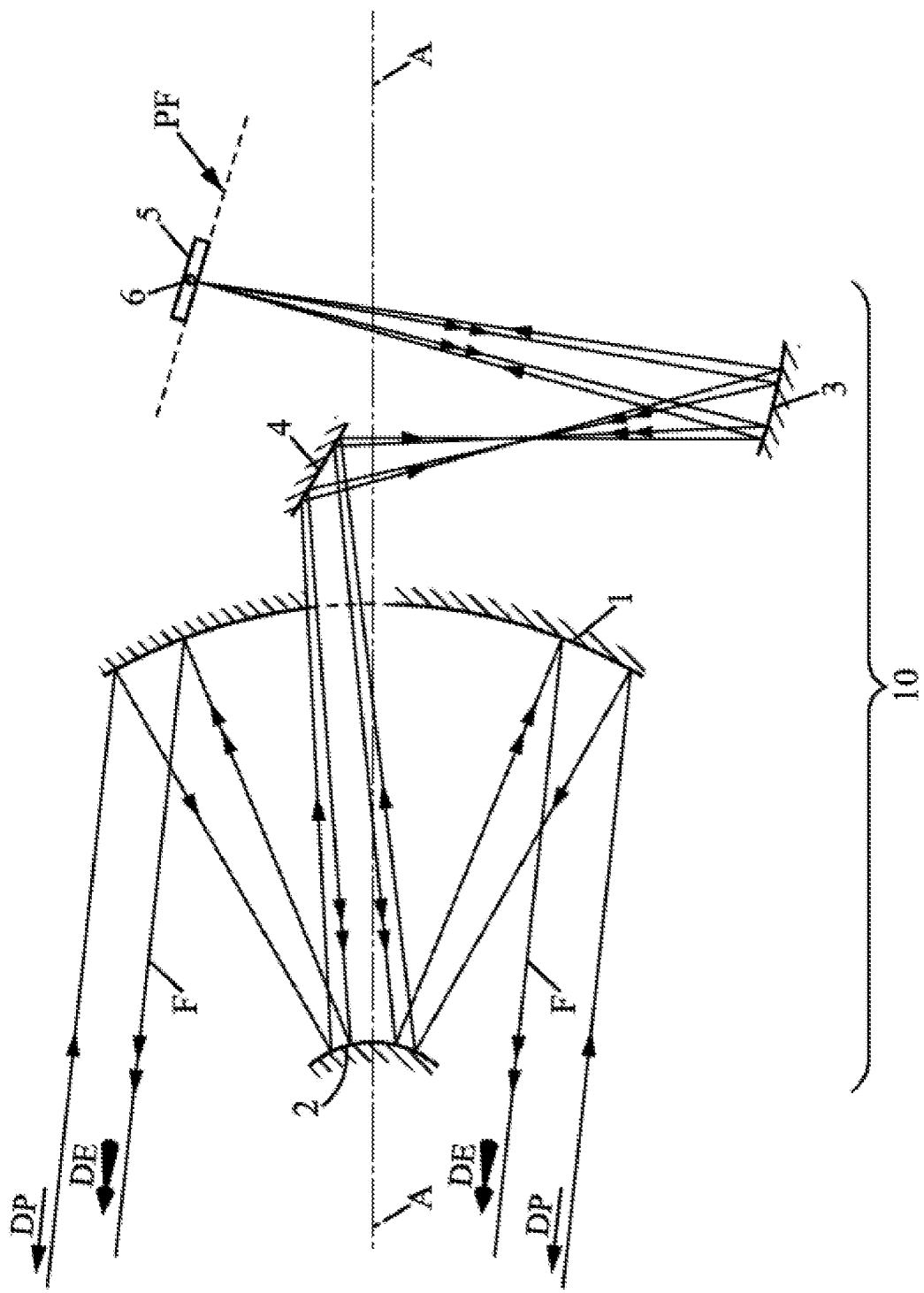

The invention is first described in detail for a telescope 10 having three mirrors which are denoted 1 for the primary mirror, 2 for the secondary mirror, and 3 for the tertiary mirror in FIGS. 2 to 4. The primary mirror 1 is generally concave, the secondary mirror 2 may be convex, and the tertiary mirror 3 concave. Such a telescope offers multiple possibilities for placing an image sensor in the focal plane PF of the telescope in order to capture an image of a distant scene contained within the input optical field of the telescope. A first possibility consists of placing the image sensor close to the optical axis of the telescope, in an area called the Cassegrain field of view. A second possibility consists of placing the image sensor in an area which is off-center relative to the optical axis of the telescope, and called a Korsch field of view. In a known manner, the configuration of the three-mirror telescope provides a superior image quality in the Korsch field of view in comparison to the Cassegrain field of view. In addition, the Korsch field of view is wider than the Cassegrain field of view. For these reasons, a Korsch configuration is widely used in imaging.

Figure 1:
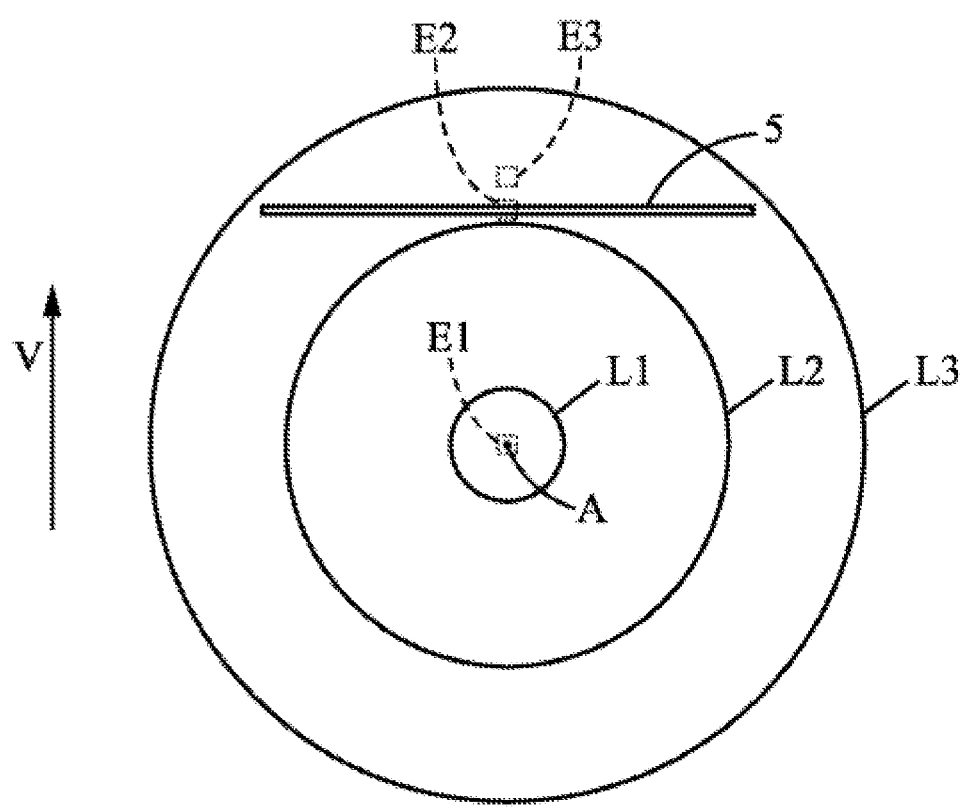
FIG. 1 shows areas of an input optical field of a three-mirror telescope.

In FIG. 1, the reference L3 denotes the outer peripheral boundary of the input optical field of a three-mirror telescope. L1 is then the peripheral boundary of the Cassegrain field of view, and L2 is the inner boundary of the Korsch field of view. In other words, the Korsch field of view is contained between boundaries L2 and L3. The image sensor 5 is located in the area of the focal plane PF corresponding to the Korsch field of view, for example in the form of a linear sensor which is oriented perpendicularly to the scrolling speed V of the image in the focal plane PF of the telescope. Thus, the laser radiation from a source used to produce transmission signals may be introduced into the optical field of the telescope according to the invention at one of three locations: a location E1 which is inside the image of the Cassegrain field of view, corresponding to the embodiment of FIG. 2, a location E2 that is superimposed on the image sensor within the image of the Korsch field of view, corresponding to the embodiment of FIG. 3, or a location E3 that is again within the image of the Korsch field of view but is offset with respect to the image sensor, corresponding to the embodiment of FIG. 4.

In such a three-mirror telescope, the imaging radiation originating from a distant scene located in the pointing direction DP is first reflected by the primary mirror 1, then by the secondary mirror 2, then by the secondary mirror 3, and converges on the image sensor 5. Rays corresponding to this imaging radiation are indicated in the figures by simple arrows. A deflecting mirror 4 may be used in the optical path of the imaging radiation between the secondary mirror 2 and the tertiary mirror 3. "A" in FIG. 1 or "A-A" in FIGS. 2 to 5 designates the optical axis of the Cassegrain field, which is perpendicular to the focal plane PF.

The source of laser radiation which is used to generate laser transmission signals is denoted 6. This may for example be a laser diode, or the output from a fiber emitting laser radiation. In the following, one can assume that the source 6 is localized or effectively localized in nature. Rays which correspond to this laser radiation are indicated with double arrows in the figures.

According to the invention, at least the primary 1 and secondary 2 mirrors are additionally used for emitting laser transmission signals towards a remote receiver which is intended to receive these signals. In a known manner, such signals are used to transmit data over very large distances at very high transmission speeds.

In the first embodiment of the invention which is represented in FIG. 2, the laser radiation source 6 is located within an image of the Cassegrain field of view, inside an intermediate focal plane of the telescope 10 that is formed by the primary 1 and secondary 2 mirrors, excluding the tertiary mirror 3. Its direction of emission is therefore collinear with the optical axis A-A. The intermediate focal plane, denoted PI, is therefore optically conjugate through mirrors 1 and 2 with scene elements located at a great distance in front of the primary mirror 1, within the Cassegrain field of view. Thus, when the laser communication receiver is located at a great distance in front of the telescope 10 along the optical axis A-A, the laser radiation which is produced by the source 6, and which constitutes the laser transmission signals, is first reflected by the secondary mirror 2, then by the primary mirror 1, then propagates in the form of a parallel beam F in the direction of the remote receiver. In this particular embodiment of the invention, the direction of emission of the laser transmission signals, denoted DE, is therefore parallel to the optical axis A-A of the Cassegrain field of the telescope 10 in front of the primary mirror 1.

In the second embodiment of the invention which is represented in FIG. 3, and which shows a Korsch type telescope as described with reference to FIGS. 1 and 2, the localized or effectively localized source of laser radiation 6 is arranged in a secondary focal plane PS whose optical axis through the three mirrors 1, 2, and 3 is collinear with that of the focal plane PF, used to contain the image sensor 5. For this purpose, a focal plane duplication element, denoted 7, may be arranged in the path of the radiation between the tertiary mirror 3 and the image sensor 5. The secondary focal plane PS is thus different from the focal plane PF, such that the source of laser radiation 6 can be positioned in the secondary focal plane PS at a location which is superimposed on the image of a point of the image sensor 5 by the element 7. If the source 6 is superimposed in this manner on the image of the middle of the image sensor 5 by the element 7, then the direction of emission DE of the laser transmission signals is coincident with the pointing direction of the telescope DP (arrows DP and DE are parallel in FIG. 3). For example, when the laser radiation produced by the source 6 has a wavelength equal to 1.55 microns, and the radiation to which the image sensor 5 is sensitive is within the visible light range, the focal plane duplication element 7 may be a dichroic plate. Alternatively, it may be a mirror which is provided with an aperture, for reflecting one of the two radiations, either the one intended for the image sensor 5 or the one produced by the source 6, and for transmitting the other radiation through the aperture, depending on the transverse dimensions of the beams of the two radiations at the element 7.

Finally, in the third embodiment of the invention which is illustrated by FIG. 4, and which again uses the Korsch telescope of FIGS. 1 and 2, the laser radiation source 6 may be arranged in the focal plane PF of the telescope 10, at a location in this plane which is offset relative to the image sensor 5. For example, the source 6 may be located to the right of the middle of the image sensor 5 within the focal plane PF, corresponding to a position outside the plane of FIG. 4. In this case, the direction of emission DE is oblique to the plane of FIG. 4 (arrows DE having line edges that are not parallel), with a component in the plane of the figure which is parallel to the pointing direction DP.

To demonstrate the generality of the invention regarding the type of telescope used, it is now described for a telescope 10 of the Cassegrain type, with reference to FIG. 5. Such a telescope has only two mirrors: a primary mirror 1 which is concave and a secondary mirror 2 which is convex. By again using an element 7 to duplicate the focal plane PF of the telescope 10, the image sensor 5 can be located on the optical axis A-A of the telescope, while the source of laser radiation 6 can be located at the intersection between the image of optical axis A-A formed by the element 7 and the secondary focal plane PS which is also formed by this element 7. In such a configuration, the pointing direction DP of the telescope 10 for the imaging function, and the direction of emission DE of the laser transmission signals, are both coincident with the optical axis A-A.

In the four embodiments of combined systems for imaging and communication by laser signals which have just been described with reference to FIGS. 2 to 5, the primary mirror 1 and secondary mirror 2 are shared by the imaging function and the laser signal emission function. In addition, the tertiary mirror 3 is also shared by both functions in the embodiments of FIGS. 3 and 4. The mirrors shared by both functions form, with the source of laser radiation 6, the emission path of the communication by laser signals. This emission path further comprises a laser communication controller which is labeled CTRL and denoted 60 in FIG. 6.

Optionally, a path for receiving laser communication signals (not shown) may be added in order to form an emission and reception terminal for laser signal communication. The combining of the reception path with the emission path, in particular using the same mirrors for collecting and transmitting the laser radiation in the propagation directions which are opposite directions in the two paths, is not directly a part of the invention and can be taken from laser signal communication terminals known to those skilled in the art. Advantageously, the optical paths of the laser radiation produced by the source 6 for transmission signals intended for the remote receiver, and external signals coming from the remote receiver, can follow optical paths which are identical within the telescope although traveled in opposite directions. The reception path is then formed by the mirrors of the telescope which are shared by the functions of imaging and emitting laser transmission signals, by a receiving sensor on which the radiation of the external laser signals received is focused by the mirrors, and by a portion of the laser communication controller 60 which is dedicated to the reception function.

Referring to FIG. 6, a satellite 100 carries a system for imaging and communication by laser signals which may be according to one of the embodiments just described. The telescope 10 and image sensor 5 are rigidly fixed on a frame 101 of the satellite, so that the pointing direction DP for the imaging function is fixed with respect to the entire satellite 100. The pointing direction DP is therefore directed towards a scene to be captured in an image by orienting the entire satellite 100. To do this, the satellite 100 is equipped with means 11 for changing its orientation, called satellite orientation means, and an attitude and orbit control system 12, labeled SCAO. For example, the means 11 may be of the CMG type ("control moment gyro"), or of the reaction wheel type, or a combination. The attitude and orbit control system 12 may be of a model known to the skilled person. Usually, attitude and orbit control systems use an inertial reference frame to identify the position and orientation of the satellite, meaning a reference frame that is fixed relative to the distant stars. The reference 50 denotes a data processing and storage unit for images generated by each shot obtained using the telescope 10 and the image sensor 5. This data processing and storage unit 50 is labeled "COMPUT. & STORAGE" in FIG. 6.

The laser signal emission terminal which uses at least a portion of the telescope 10, in accordance with the invention, is without any coarse pointing assembly since the telescope 10 is rigidly fixed to the frame 101 of the satellite 100, and is without any orientable output mirror.

The source of laser radiation 6 is fixed relative to the telescope 10, but the direction of emission DE of the laser transmission signals may possibly be varied with respect to the frame 101 of the satellite 100 by using a fine pointing assembly. Such a fine pointing assembly may be optically positioned between the source 6 and the portion of the telescope 10 that is used for outwardly emitting the laser radiation. However, such a fine pointing assembly, not shown in the figures, is optional in the invention and preferably is not provided in the laser signal emission terminal which is on board the satellite 100. Therefore, in the absence of a fine pointing assembly, the direction of emission DE of the laser transmission signals can only be adjusted by using the satellite orientation means 11. For the laser transmission signals to be actually received by the laser communication receiver which is located at a great distance from the satellite 100, the adjustment of the direction of emission DE by using only the satellite orientation means 11 must be sufficiently precise. The following two error contributions can reduce the accuracy of the adjustment of the direction of emission DE which is achieved by orienting the entire satellite:

/i/ a first error contribution that occurs when determining the target direction in which the laser transmission signals are to be emitted, with respect to the actual direction towards the remote receiver for which the signals are intended; and /ii/ a second error contribution that appears between the target direction serving as a reference orientation of the satellite 100, and the direction of emission DE which is actually produced by the satellite orientation means 11.

The total error that is acceptable depends on the diameter of the laser beam F emitted by the telescope 10, measured at the laser communication receiver which is the destination of the laser signals. Because the satellite 100 is tasked with capturing images of the surface of the Earth, its orbital altitude is low, typically between 400 km and 2000 km. Two different configurations may then be used for transmitting by laser communication the data corresponding to the captured images:

Configuration 1: the data are transmitted to a laser communication receiver which is located on Earth, or to another satellite which is also located in a low-altitude orbit. In both cases, the transmission distance is typically less than 5000 km;

Configuration 2: the data is transmitted to a laser communications relay which is located on a geostationary satellite. The transmission distance is then similar to the altitude of the geostationary orbit, meaning approximately between 33,000 km and 40,000 km.

In configuration 1, the total pointing error for the direction of emission DE of laser transmission signals must be less than or equal to 20 µrad (microradian).

Existing attitude and orbit control systems and satellite orientation means are used to orient the satellite with an error that is less than 10 µrad, for a target direction that is determined in an inertial reference frame. This error, which corresponds to the above error contribution /ii/, is acceptable even in the absence of a fine pointing assembly.

The coordinates of the laser communication receiver for which the laser signals are intended, are generally known with great precision in the terrestrial reference frame, and their conversion to the inertial system poses no problems. Error contribution /i/ then results primarily from calculating the position of the satellite 100 for the moment when the laser transmission signals will be emitted.

Conventionally, in other words prior to the invention, this position of the satellite 100 for the moment of emission of the laser transmission signals was calculated from a previous position of the satellite, this measurement only being updated once per revolution of the satellite in its orbit, typically once every 90 minutes or so for a low-altitude orbit. The position of the satellite at the moment of emission was calculated from the last updated measurement of the actual position of the satellite. However, this calculation is responsible for the main portion of error contribution /i/, resulting in an error that can reach 1000 µrad (microradian) between the target direction and the actual direction in which the laser communication receiver is located at the moment of emission. Such an error does not pose any problems for capturing images in the imaging function, but is incompatible with the precision required for communication by laser signals (total pointing error for the direction of emission DE less than or equal to 20 µrad).

To reduce error contribution /i/, according to a further feature of the invention a geolocation device 14 (FIG. 6) and a module 13 for calculating the target direction of emission of laser transmission signals are also on board the satellite 100. The device 14 comprises a receiver for geolocation signals coming from a constellation of geolocation satellites 201-206, and a calculator for deriving the position of the satellite 100 from the geolocation signals received. For example, the geolocation device 14 may be adapted for the GPS system, acronym for "Global Positioning System", or any other geolocation system that is deployed around the Earth. The positional accuracy of the satellite 100 as provided by the geolocation device 14 is then within a few meters, and this position determined by geolocation may be updated as often as necessary, or may even be determined in real time for each emission sequence of laser transmission signals. It is thus possible to avoid almost entirely the error contributions /i/ due to calculating a new satellite position from a too-old measured position.

The module 13, labeled MOD., receives the coordinates of the satellite position 100 as derived from the last performed geolocation. These coordinates are usually expressed in the terrestrial reference frame. The coordinates of the satellite 100 at the next moment of emission of laser transmission signals are derived from these, for example again in the terrestrial reference frame, but the time between the moment of the last performed geolocation and the moment of emission is small enough that this calculation of the movement of the satellite 100 only causes negligible error. The module 13 then converts, to the inertial reference system, the satellite coordinates 100 at the future moment of emission, as well as those of the laser communication receiver at the same future moment of emission, and then deduces the target direction of emission in the inertial reference frame. The error contribution /i/ obtained in this manner, concerning the target direction of emission of laser transmission signals, is only a few microradians, which is compatible with the requirement indicated above for laser communication signals in configurations 1 and 2.

The target direction so calculated by the module 13 is transmitted to the attitude and orbit control system 12, and that system controls the orientation means 11 so as to orient the satellite 100 in the target direction for the moment of emission of the laser transmission signals. Essentially, the required gain in accuracy for the direction of emission DE of the laser transmission signals is provided by the accuracy of existing geolocation systems, and by the almost continuous availability of a new update for the satellite position when this is determined by geolocation.

The data corresponding to images previously captured using the telescope 10 and the image sensor 5 can then be sent by the processing and storage unit 50 to the laser communication controller 60. The latter then triggers their transmission, by actuating the source of laser radiation 6 when the satellite 100 is in the selected emission position in its orbit and the direction of emission DE has been brought to the target direction by the satellite orientation means 11.

If the accuracy in the direction of emission DE of the laser transmission signals would still be insufficient, particularly for configuration 2 mentioned above, and for a satellite 100 in accordance with the invention as has just been described, at least one of the two following additional devices may be placed on board the satellite 100, in the laser communication portion of the combined system for imaging and communication by laser signals:

- a target acquisition and tracking system: such a system comprises a detector with an array of photoelements sensitive to the laser radiation of the communication signals received from the remote laser communication receiver. These received signals may equally well be beacon signals, control signals, or data signals. The array-based detector is placed in the focal plane PF of the telescope 10, or in a secondary focal plane which is produced using an appropriately arranged focal plane duplication element. Then the difference between a point of the detector array in which the laser radiation of the received signals is detected, and a reference point which corresponds to the direction of emission DE, can serve as a feedback parameter that is passed to the attitude and orbit control system. Such an operation with real-time feedback improves the accuracy of the direction of emission DE relative to the actual direction of the laser communication receiver;
- a fine pointing assembly: such an assembly, based on a movable mirror of small dimensions, allows adjusting the direction of emission DE in real time with a constant reaction time that is very short, in addition to the adjustment carried out by the satellite orientation means 11.

Preferably, if the addition of the target acquisition and tracking system, performed first, is insufficient to achieve the accuracy required for the direction of emission DE with no fine pointing assembly, only then is a fine pointing assembly added, performed second. Generally, the orientation of the movable mirror of the fine pointing assembly is controlled according to the deviation, on the array-based detector of the target acquisition and tracking system, of the point where the laser radiation from the remote laser communication receiver is received.

The implementation of each of these two additional devices in a combined system for imaging and communication by laser signals in accordance with the invention, is identical to the implementation used in laser communication terminals which are independent of imaging devices and which is assumed to be well known. For this reason, implementations of these two optional devices are not described here again.

Finally, FIG. 7 shows the Earth, denoted T and having point CT at its center. The satellite 100 of the invention moves in orbit $O_{100}$, within the region of low-altitude orbits. Independently of the satellite 100, geolocation satellites 201-206, with no limitation placed on their number, form a constellation capable of covering any position of the satellite 100 in its orbit $O_{100}$. At a position in its orbit $O_{100}$, the satellite 100 receives geolocation signals from some of the geolocation satellites, for example signals $G_{201}$, $G_{205}$, and $G_{206}$ respectively transmitted by satellites 201, 205, and 206. The reference R denotes the laser communication receiver in a case where it is located on Earth. Then the implementation of the invention enables the satellite 100 to emit laser transmission signals towards the receiver R, in the form of a laser beam F, with an accuracy in the direction of emission which is sufficient to obtain satisfactory reception quality.

Finally, one is reminded that the invention can be implemented in a similar manner when the laser communication receiver R is on another satellite in a low-altitude orbit, or on a geostationary satellite.

One is also reminded that the invention is independent of the type of telescope used, to the extent that the telescope has at least two mirrors useful in the formation of images, meaning mirrors that alter the convergence of radiation beams.

Lastly, one is also reminded that the use of a target acquisition and tracking system and of a fine pointing assembly are optional, and that the preferred embodiments of the invention are without any such devices.

The invention claimed is:

1. A combined system for imaging and communication by laser signals, the combined system comprising:
    a telescope comprising at least a primary mirror, a secondary mirror and a tertiary mirror adapted to form in a focal plane of the telescope an image of a scene in a pointing direction of the telescope by reflection of radiation received from the scene at least on the primary mirror, then on the secondary mirror and then on the tertiary mirror;
    an image sensor arranged in the focal plane of the telescope and configured to capture the image of the scene;
    a source of laser radiation configured to produce laser transmission signals, and
    a frame in a satellite configured for operation in outer space and supporting the source of laser radiation, the image sensor and the telescope, wherein the telescope is affixed to the frame so that a pointing direction of the telescope is fixed with respect to the frame;
    wherein the source of laser radiation is arranged so that laser radiation which constitutes the laser transmission signals is reflected at least by the secondary mirror and by the primary mirror to be emitted towards a laser communication receiver external to the combined system,
    wherein the combined system is arranged so that the laser radiation, which constitutes the laser transmission signals, is reflected at least by the secondary mirror then by the primary mirror for emission towards the laser communication receiver external to the combined system, and
    wherein said laser radiation which constitutes the laser transmission signals is introduced into an intermediate focal plane of the telescope.

2. A combined system for imaging and communication by laser signals comprising:
    a telescope comprising at least a primary mirror, a secondary mirror and a tertiary mirror, and configured to form, in a focal plane of the telescope, an image of a scene located in a pointing direction of the telescope by reflection of radiation received from the scene at least on the primary mirror, then on the secondary mirror and then on the tertiary mirror;
    an image sensor arranged in the focal plane of the telescope and configured to capture the image of the scene;
    a source of laser radiation configured to produce laser radiation which includes laser transmission signals,
    a frame in a satellite configured for operation in outer space and supporting the source of laser radiation, the image sensor and the telescope, wherein the telescope is affixed to the frame so that a pointing direction of the telescope is fixed with respect to the frame;
    wherein the laser radiation which constitutes the laser transmission signals is successively reflected by the tertiary mirror, then by the secondary mirror, then by the primary mirror for emission towards a laser communication receiver external to the combined system, and wherein the laser radiation which includes the laser transmission signals is brought into the focal plane of the telescope at a location of said focal plane of the telescope that is distanced from the image sensor.

3. A combined system for imaging and communication by laser signals comprising:
a telescope comprising at least a primary mirror, a secondary mirror and a tertiary mirror, and the telescope is adapted for forming, in a focal plane of said telescope, an image of a scene located in a pointing direction of the telescope by reflection of radiation received from the scene at least on the primary mirror, then on the secondary mirror and then on the tertiary mirror; and
an image sensor arranged in the focal plane of the telescope and configured to capture the image of the scene;
a source of laser radiation configured to produce laser radiation which includes laser transmission signals;
a frame in a satellite configured for operation in outer space and supporting the source of laser radiation, the image sensor and the telescope, wherein the telescope is affixed to the frame so that a pointing direction of the telescope is fixed with respect to the frame;
a focal plane duplication element arranged to create an image of the focal plane of the telescope which forms a secondary focal plane, and
the combined system being arranged so that the laser radiation which constitutes the laser transmission signals is brought to the secondary focal plane at a location of said secondary focal plane which is optically superimposed on the image sensor by the focal plane duplication element, and so that the laser radiation of the laser transmission signals, produced by the source of laser radiation, is directed by said focal plane duplication element toward the tertiary mirror, then successively reflected by said tertiary mirror, then by the secondary mirror, then by the primary mirror, in order to be emitted towards a communication receiver external to the combined system.

4. The combined system according to claim 3, wherein the focal plane duplication element comprises an additional mirror or a dichroic plate, arranged to reflect one of the laser radiation of the laser transmission signals and the radiation received from the scene, and to transmit without reflection by said additional mirror or said dichroic plate, the other one of said laser radiation of the laser transmission signals and said radiation received from the scene.

5. A satellite configured for placement in orbit around the Earth, comprising:
a combined system for imaging and communication by laser signals comprising:
a telescope, comprising at least a primary mirror and a secondary mirror, and adapted for forming, in a focal plane of said telescope, an image of a scene located in a pointing direction of the telescope, by reflection of radiation received from the scene at least on the primary mirror then on the secondary mirror; and
an image sensor arranged in the focal plane of the telescope, and able to capture the image of the scene; and
a source of laser radiation, adapted for producing laser transmission signals,
wherein the combined system is configured for being affixed onto a frame of a satellite so that a pointing direction of the telescope is fixed with respect to the frame;
wherein the source of laser radiation is arranged so that the laser radiation which constitutes the laser transmission signals is reflected at least by the secondary mirror then by the primary mirror, to be emitted towards a laser communication receiver external to the combined system;
satellite orientation means; and
an attitude and orbit control system, adapted for controlling the satellite orientation means in order to bring a direction of emission of the laser transmission signals to a target direction, so that the combined system for imaging and communication by laser signals then emits the laser transmission signals in the target direction,
the satellite further comprising:
a geolocation device adapted for receiving geolocation signals and to calculate a position of the satellite based on the geolocation signals received; and
a module adapted for calculating the target direction based on the position of the satellite as calculated by the geolocation device and based on coordinates of the laser communication receiver external to the combined system, so that the target direction points from the satellite towards the laser communication receiver.

6. The satellite according to claim 5, wherein the geolocation device is a GPS device.

7. The satellite according to claim 5, wherein an accuracy of the geolocation device for calculating the satellite position, and an accuracy of the satellite orientation means are adapted so that the laser transmission signals emitted by the combined system are received by the laser communication receiver external to the combined system while the direction of emission of the laser transmission signals is kept fixed with respect to the telescope.

8. The satellite according to claim 7, wherein the satellite does not include a target acquisition and tracking detector operating based on external laser signals emitted by the laser communication receiver external to the combined system, and wherein the accuracy of the geolocation device for calculating the satellite position and the accuracy of the satellite orientation means are adapted so that the laser transmission signals emitted from the satellite are received by the laser communication receiver external to the combined system, when the satellite orientation means are controlled to orient the direction of emission of the laser transmission signals to the target direction.

9. A method for communication by laser signals, implemented on board the satellite which is configured for placement in orbit around the Earth and in accordance with claim 5, the method comprising the following steps:
a. receiving geolocation signals, then calculating a position of the satellite from the geolocation signals received;
b. from the position of the satellite calculated in step a, and from the coordinates of the laser communication receiver external to the combined system, calculating the target direction
c. orienting the satellite in accordance with the calculated target direction, then activating the source of laser radiation in order to emit the laser transmission signals towards the laser communication receiver,
wherein step a is executed multiple times during one revolution of the satellite in its orbit, and steps b and c are executed using the satellite position as calculated in the latest execution of step a.

10. The method according to claim 9, wherein an orbit altitude of the satellite is less than 2000 km, and the laser communication receiver is located on the Earth's surface or on board another Earth satellite having a different orbit altitude that is also less than 2000 km, or on another satellite which is in geostationary orbit.

\* \* \* \* \*